United States Patent
Göransson

(10) Patent No.: US 8,958,467 B2
(45) Date of Patent: Feb. 17, 2015

(54) REPORTING CHANNEL QUALITY INFORMATION FOR MULTIPLE CHANNELS

(75) Inventor: Bo Göransson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 511 days.

(21) Appl. No.: 13/061,421

(22) PCT Filed: Sep. 4, 2008

(86) PCT No.: PCT/SE2008/050994
§ 371 (c)(1),
(2), (4) Date: Feb. 28, 2011

(87) PCT Pub. No.: WO2010/027307
PCT Pub. Date: Mar. 11, 2010

(65) Prior Publication Data
US 2011/0158305 A1  Jun. 30, 2011

(51) Int. Cl.
H04B 3/46 (2006.01)
H04L 1/00 (2006.01)
H04J 11/00 (2006.01)

(52) U.S. Cl.
CPC ............. *H04L 1/0026* (2013.01); *H04J 11/004* (2013.01); *H04L 1/0029* (2013.01)
USPC .......................................................... 375/227

(58) Field of Classification Search
USPC .................. 370/468; 375/227; 455/452.2
See application file for complete search history.

(56) References Cited

U.S. PATENT DOCUMENTS

| | | | | |
|---|---|---|---|---|
| 2005/0111429 A1* | 5/2005 | Kim et al. | | 370/344 |
| 2006/0089104 A1* | 4/2006 | Kaikkonen et al. | | 455/67.13 |
| 2006/0285585 A1* | 12/2006 | Sampath | | 375/227 |
| 2007/0149233 A1* | 6/2007 | Wang et al. | | 455/522 |
| 2008/0013610 A1* | 1/2008 | Varadarajan et al. | | 375/221 |
| 2008/0101407 A1* | 5/2008 | Khan et al. | | 370/468 |
| 2008/0298482 A1* | 12/2008 | Rensburg et al. | | 375/260 |

FOREIGN PATENT DOCUMENTS

EP    1786130 A1    5/2007
WO    2008/058112 A2    5/2008

OTHER PUBLICATIONS

Kim, B.-H. et al. "Selective Virtual Antenna Permutation for Layered OFDM-MIMO Transmission." IEEE Global Telecommunications Conference, 2006 (GLOBECOM '06), Nov. 1, 2006, pp. 1-6.

* cited by examiner

*Primary Examiner* — Leon-Viet Nguyen
(74) *Attorney, Agent, or Firm* — Coats & Bennett, PLLC

(57) ABSTRACT

Aspect of the invention relate to a method for reporting channel quality information from a user equipment (UE) to a base station. In some embodiments, the method includes: determining a first channel quality value (CQ1) for a first channel; reporting channel quality for the first channel, wherein the step of reporting channel quality for the first channel comprises transmitting from the UE to the base station a first channel quality indicator value (CQI1) consisting of n bits; determining a second channel quality value (CQ2) for a second channel; after determining CQ2, calculating a value of X, wherein X equals (i) DeltaCQ+an offset parameter value (P) or (ii) DeltaCQ−P, wherein P does not equal zero, and DeltaCQ equals (i) CQ1−CQ2, (ii) CQ2−CQ1, (iii) CQI1−CQI2 or (iv) CQI2−CQI1, wherein CQI2 is a function of CQ2; and after calculating X, reporting channel quality for the second channel by transmitting from the UE to the base station an m bit value X', wherein X' is a function of X and m<n.

38 Claims, 5 Drawing Sheets

REPORTING CHANNEL QUALITY INFORMATION FOR MULTIPLE CHANNELS

TECHNICAL FIELD

The present invention relates to the reporting of channel quality information for multiple channels.

BACKGROUND

One technique for providing high bit rates on a communication link employs two or more antennas at both sides of the link to transmit two or more parallel data streams. This technique is referred to as "multiple input multiple output" (MIMO). Using MIMO, the spectrum efficiency of a radio-link can be N-folded, where N is the number of Tx/Rx antennas.

A drawback for some MIMO systems is that channel quality information must be fed back to the network in order to provide information for a link adaptation algorithm. Traditionally, a channel quality indicator (CQI) is used to inform the network about the current channel quality. When MIMO is used. the quality of all the parallel streams is needed by the link adaptation algorithm. This will increase the feedback rate of the CQI and hence limit the performance, especially for power limited handheld terminals.

For some protocols (e.g., High-Speed Downlink Packet Access (HSDPA)), the CQI consists of a 5-bit word which represents the number of bits that can be received during a transmission time interval (TTI) (with a certain block error rate (BLER)). Hence, the mobile terminal (a.k.a., user equipment (UE)) measures a channel quality (e.g., signal to interference plus noise ratio (SINR), signal to noise ratio (SNR), or other measure of channel quality) and maps this to a table containing transport formats (TF). The index to a certain TF is then transmitted back to the network node as the CQI. The network node uses this CQI when deciding on a suitable transmission format. When MIMO is in use, the CQI per data stream is a 4-bit word corresponding to the quality of that data stream. This means that the CQI feedback is increased from 5 to 8-bits when two streams are in use.

For long term evolution (LTE) a similar scheme is used. But, in contrast to HSDPA, the CQI for the second stream is differentially encoded versus the first stream. This means that the quality reported for the second stream is the difference towards the first stream. As in HSDPA, the CQI for the first stream is represented by a 4-bit word, while the difference between the two streams is reported as a second CQI. Since the difference, in general, is smaller than the total dynamic range for one CQI, this can be represented by a 3-bit word. This means that we can save at least 1 bit for each CQI transmission.

In HSPA UL it is reasonable to assume that interference cancelling receivers will be in use in a high performance network because UL interference is the quantity that will limit the performance. If the impact from other users is removed, a much higher interference contribution can be tolerated, hence the capacity can be increased. It is therefore likely that interference cancellation techniques also will be applied to MIMO in UL, when introduced. However, designing a system towards one type of algorithm is not preferred because the technical evolution within receiver algorithms is fast, and better algorithms may be available in a not too distance future.

The differential CQI reporting approach described above assumes that the two CQIs are reasonably similar. For a linear receiver (e.g. an MMSE based receiver) the two streams will, on average, have the same SINR. The difference, in rate, between the two streams will then be rather small. Hence, the difference can be coded with a smaller number of bits than if the two CQIs were reported separately.

On the other hand, if a receiver structure based on inter-stream interference cancellation is used, then the two streams may experience very different SINR. For example, when using a successive interference canceller (SIC), where the influence of stream one is removed before detecting stream two, the SINR for stream two will be higher than if the interference was not removed. Accordingly, the mean rate of the two streams may become very different, hence the difference in reported CQI can be substantial. In this case, it is not possible to represent the difference with fewer bits than the individual CQIs. Thus, the differential CQI reporting approach will not be advantageous anymore.

Thus, there exists a need to overcome this above described problem.

SUMMARY

In one aspect, an embodiment of the invention provides a method for reporting channel quality information from a first communication apparatus (e.g., a user equipment (UE)) to a second communication apparatus (e.g., a base station). In some embodiments, the method includes: determining a first channel quality value (CQ1), wherein CQ1 corresponds to a quality measurement for a first channel; reporting channel quality for the first channel, wherein the step of reporting channel quality for the first channel comprises transmitting from the first communication apparatus to the second communication apparatus a first channel quality indicator value (CQI1) consisting of n bits, wherein CQI1 is a function of CQ1; determining a second channel quality value (CQ2), wherein CQ2 corresponds to a quality measurement for a second channel; after determining CQ2, calculating a value of X, wherein X equals (i) DeltaCQ+an offset parameter value (P) or (ii) DeltaCQ−P, wherein P does not equal zero, and DeltaCQ equals (i) CQ1−CQ2, (ii) CQ2−CQ1, (iii) CQI1−CQI2 or (iv) CQI2−CQI1, wherein CQI2 is a function of CQ2; and after calculating X, reporting channel quality for the second channel, wherein the step of reporting channel quality for the second channel comprises transmitting from the first communication apparatus to the second communication apparatus an m bit value X', wherein X' is a function of X and m<n. In some embodiments, CQI1 equals CQ1, CQI2 equals CQ2, and X' equals X.

The method may further include the step of computing P. P may be computed according to the following equation:

$$P = \left(\sum_{i=1}^{y} (DeltaCQi)\right) \Big/ y,$$

where y>1, DeltaCQi equals (i) (CQ1,$i$−CQ2,$i$) or (ii) (CQ2,$i$−CQ1,$i$), CQ1,$i$ is a measure of channel quality for the first channel, and CQ2,$i$ is a measure of channel quality for the second channel.

In some embodiments, the step of computing P is performed by the base station, whereas in other embodiments this step is performed by the UE. If performed by the base station, the base station may transmit the value P in a message to the UE, which message causes the UE to use the value P in reporting channel quality for a channel. If performed by the UE, the UE may transmit the value P in a message to the base station, which will use the value P to decode certain channel quality indicator values transmitted to the base station from the UE.

In some embodiments, CQ1 is a measured signal-to-noise ratio (SNR) value or signal to interference plus noise ratio (SINR), and CQ2 is a measured signal-to-noise ratio (SNR) value or signal to interference plus noise ratio (SINR). In such an embodiment. CQI1 may be determined by using CQ1 as an input to a look-up table and X' may be determined by using X as an input to a look-up table. In other embodiments, CQ1 is stored in a look-up table and is determined by using a SNR or SINR value as an input to the look-up table.

In another aspect, an embodiment of the invention provides a method for computing the offset parameter. In some embodiment, the method includes: calculating a plurality of delta values, wherein each delta value equals the difference between a channel quality value for a first channel and a channel quality value for a second channel; calculating the mean of the plurality of delta values; and transmitting a mean value equaling the calculated mean to (1) a base station or (2) a mobile terminal. In some embodiments, the calculating steps are performed by the mobile terminal and the transmitting step comprises transmitting the mean value from the mobile terminal to the base station. In other embodiments, the calculating steps are performed by the base station and the transmitting step comprises transmitting the mean value from the base station to the mobile terminal.

The mobile terminal is configured to use the mean value in determining a channel quality indicator value (CQI) to report to the base station. For example, the mobile terminal may use the mean value in determining the CQI to report to the base station by (i) adding the mean value to a delta value or (ii) subtracting the mean value from the delta value, wherein the delta value equals the difference between a channel quality value for a first channel and a channel quality value for a second channel. The base station uses the mean value to decode the CQI transmitted to the base station from the mobile terminal. For example, the base station may decode the channel quality indicator value by (i) adding the mean value to the CQI or (ii) subtracting the mean value from the CQI.

The method may further include the step of determining whether the plurality of delta values are consistent. This determining step may include determining the variance and/or standard deviation of the plurality of delta values and comparing the variance and/or standard deviation to a predetermined threshold. In such embodiments, in response to determining that the plurality of delta values are consistent, a delta CQI reporting command is transmitted to the mobile terminal, which command causes the mobile terminal to use differential CQI reporting and to use the mean value to calculate a plurality of channel quality indicator values that are reported to the base station.

In some embodiments, the channel quality value for the first channel is a first SNR value or a first SINR value and the channel quality value for the second channel is a second SNR value or a second SINR value. In other embodiments, the channel quality value for the first channel is a value that is determined using a first SNR value or a first SINR value and the channel quality value for the second channel is a value that is determined using a second SNR value or a second SINR value. For example, in some embodiments, the channel quality value for the first channel is determined by using the first SNR/SINR value as an input to a look-up table and the channel quality value for the second channel is determined by using the second SNR/SINR value as an input to a look-up table.

In another aspect, embodiments of the invention provide an improved mobile terminal. In some embodiments, the improved mobile terminal is configured to: to determine a first channel quality value (CQ1), wherein CQ1 corresponds to a quality measurement for a first channel; report to a base station a quality of the first channel by transmitting to the base station a first channel quality indicator value (CQI1) consisting of n bits, wherein CQI1 is a function of CQ1; determine a second channel quality value (CQ2), wherein CQ2 corresponds to a quality measurement for a second channel; calculate a value of X, wherein X equals (i) DeltaCQ+an offset parameter value (P) or (ii) DeltaCQ−P, wherein P does not equal zero, and DeltaCQ equals (i) CQ1−CQ2, (ii) CQ2−CQ1, (iii) CQI1−CQI2 or (iv) CQI2−CQI1, wherein CQI2 is a function of CQ2: and report to the base station a quality of the second channel by transmitting to the base station an m bit value X', wherein X' is a function of X and m<n.

In another aspect, embodiments of the invention provide an improved base station. In some embodiments, the improved base station is configured to: calculate a plurality of delta values, wherein each delta value equals the difference between a channel quality value for a first channel and a channel quality value for a second channel; calculate the mean of the plurality of delta values; and transmit to a mobile terminal a mean value equaling the calculated mean. The base station may be further configured to determine whether the plurality of delta values are consistent and to transmit a delta CQI reporting command to the mobile terminal in response to determining that the plurality of delta values are consistent, wherein the delta CQI reporting command causes the mobile terminal to use differential CQI reporting and to use the mean value to calculate a plurality of channel quality indicator values that are reported to the base station. The base station may be further configured to use the mean value to decode a channel quality indicator value (CQI) transmitted to the base station from the mobile terminal.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
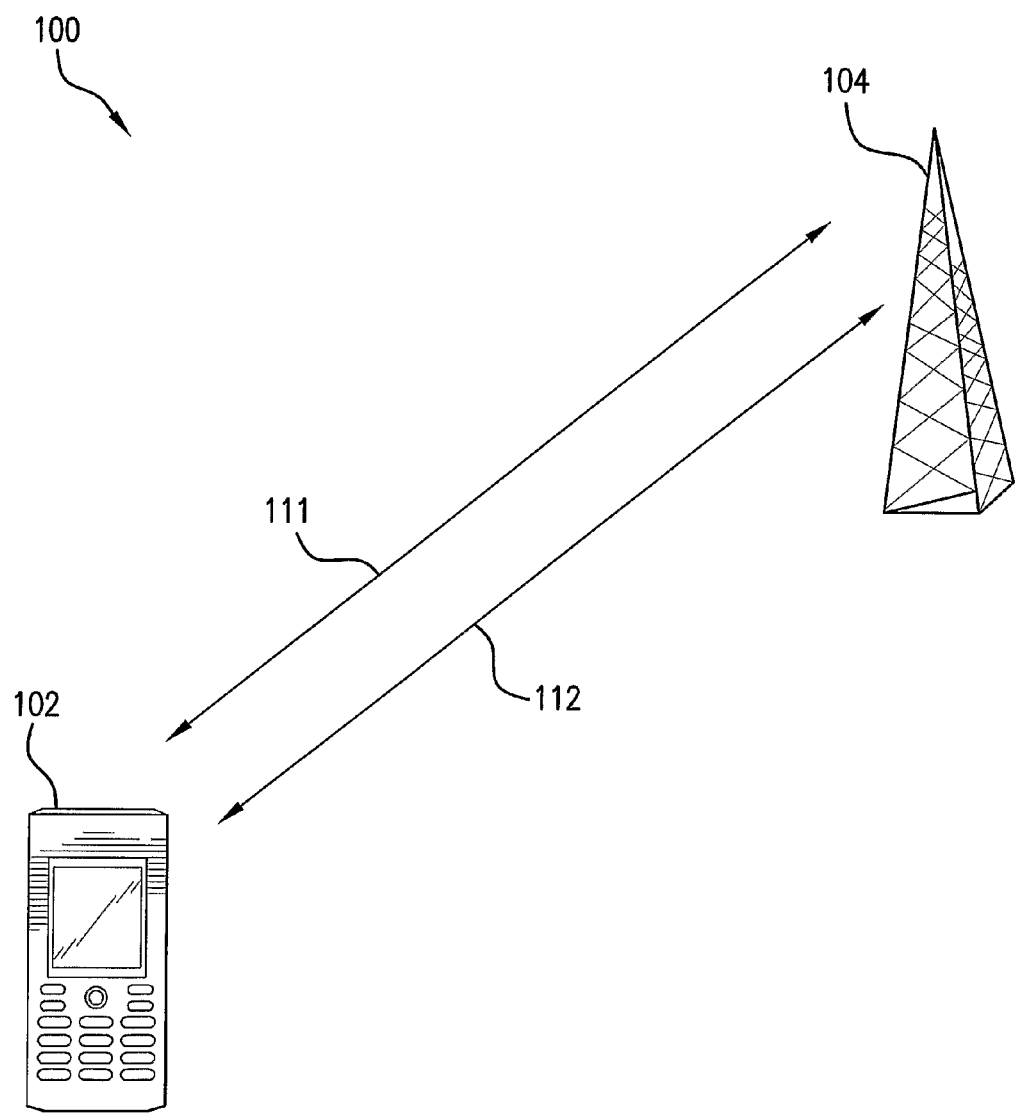
FIG. 1. illustrates a UE communicating with a base station.

Referring to FIG. 1, FIG. 1 illustrates a communication system 100. For illustrative purposes, only a single UE 102 and a single base station 104 are shown. UE 102 is configured to overcome the above described problem by utilizing an offset parameter (P) when determining a CQI value to transmit to base station 104. More specifically, UE 102 may be configured to perform the process 200 shown in FIG. 2.

Figure 2:
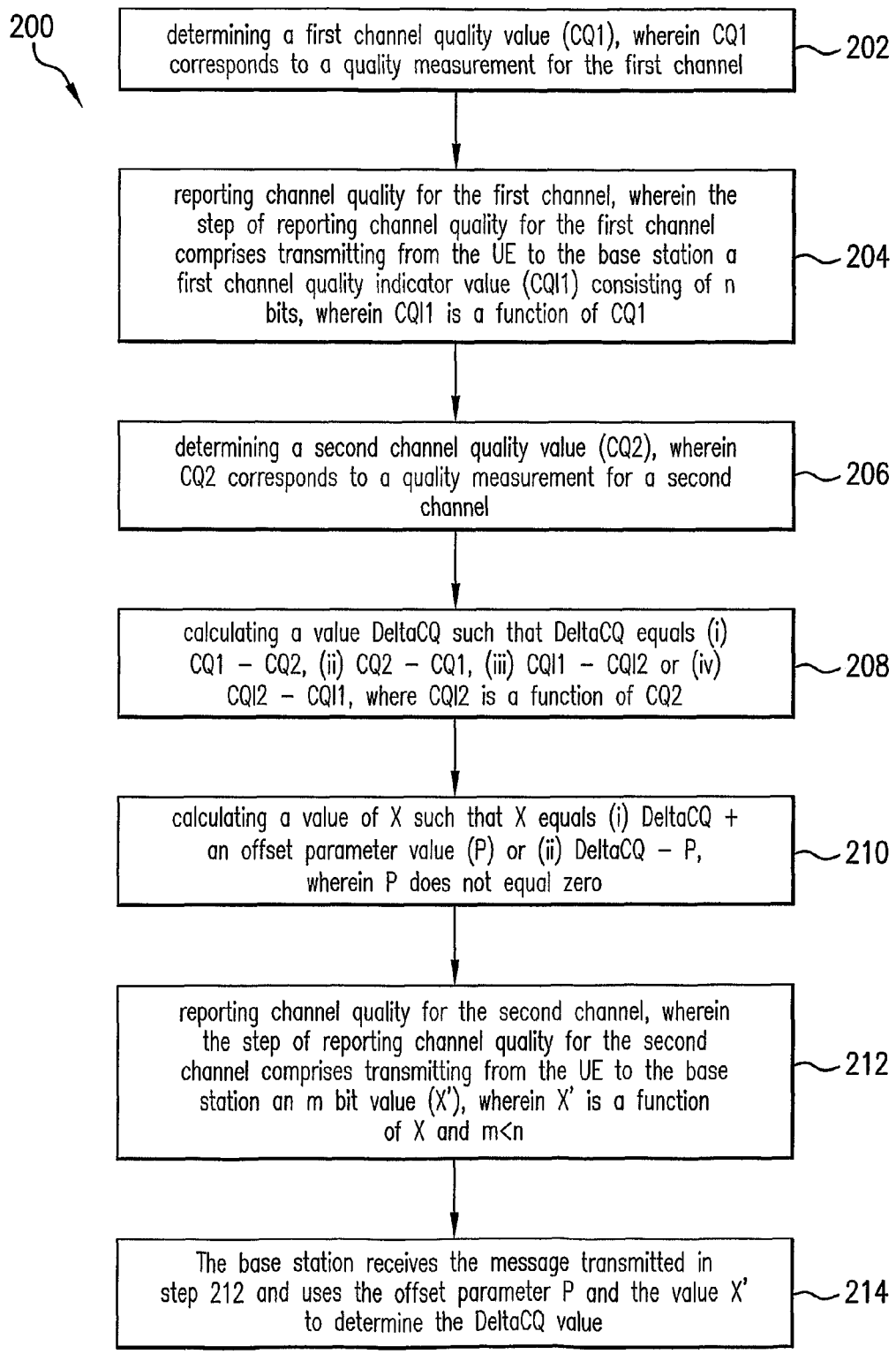
FIG. 2 is a flow chart illustrating a process according to some embodiments of the invention.

Referring now to FIG. 2, FIG. 2 is a flow chart illustrating a process 200 according to some embodiments of the invention. Process 200 may begin in step 202, where UE 102 determines a first channel quality value (CQ1) that corresponds to a quality measurement for a stream 111 (a.k.a. "channel 111") (see FIG. 1, which illustrates UE 102 utilizing two streams, stream 111 and stream 112, in communicating with base station 104).

For example, in step 202, UE 102 may measure the channel quality of channel 111 (e.g., SINR, SNR, etc.) and this SINR value (or other channel quality value) may be used as CQ1 or some other value that is determined from the SINR value may be used as CQ1. For example, CQ1 may be determined by using SINR as an input to a look-up table or may be an encoded version of the SINR value.

Next (step 204), UE 102 reports channel quality for channel 111. For example, UE 102 transmits to base station 104 a first channel quality indicator value (CQI1). CQI1 is a function of CQ1. That is, CQI1 may be CQ1 or may be a value that is determined from CQ1. As a specific example, CQ1 may be a SINR value and CQI1 may be a value that is determined by using the SINR value as an input to a look-up table or may be an encoded version of the SINR value. In some embodiments, CQI1 is an n bit value (e.g., a 4 bit value)

Next (step 206), UE 102 determines a second channel quality value (CQ2) that corresponds to a quality measurement for stream 112 (a.k.a., "channel 112").

Next (step 208), UE 102 calculates a value DeltaCQ, where DeltaCQ equals (i) CQ1−CQ2, (ii) CQ2−CQ1, (iii) CQI1−CQI2 or (iv) CQI2−CQI1. Similarly to CQI1, CQI2 is a function of CQ2.

Next (step 210), UE 102 calculates a value of X, where X equals (i) DeltaCQ+P or (ii) DeltaCQ−P. The value P, as described above, is an offset parameter. P may be determined programmatically by the UE 102 or by a network node (e.g., base station 104) or it may be a hard coded value. In some embodiments, the value P should be chosen such that, on average, X has a value of zero (0).

Next (step 212). UE 102 reports channel quality for channel 112. For example, UE 102 transmits to base station 104 a message containing the value X', where X' is a function of X. That is, X' may be X or may be a value that is determined from X. For example, X' may be determined by using X as an input to a look-up table or X' may be an encoded version of X. In some embodiments X' is a m bit value, where m<n (e.g., X' may be a 3 bit value).

Next (step 214), base station 104 receives the message transmitted in step 212 and uses the offset parameter P and the value X' to determine the DeltaCQ value. For example, the base station determines X from X' and then calculates DeltaCQ by performing one of the following calculations: (i) X+P or (ii) X−P.

By using the offset parameter P, the system can compensate for the effect on SINR caused by the inter-stream interference cancellation.

Process 200 may be repeated many times by UE 102. In some embodiments, if the average value of X' is not equal to zero, then the offset parameter may be modified (increased or decreased) such that after the modification the average value of X' is zero or close to zero than it was before the modification. If UE 102 modifies the offset parameter, then it will communicate the new offset parameter to base station 104 and vice-versa.

Figure 3:
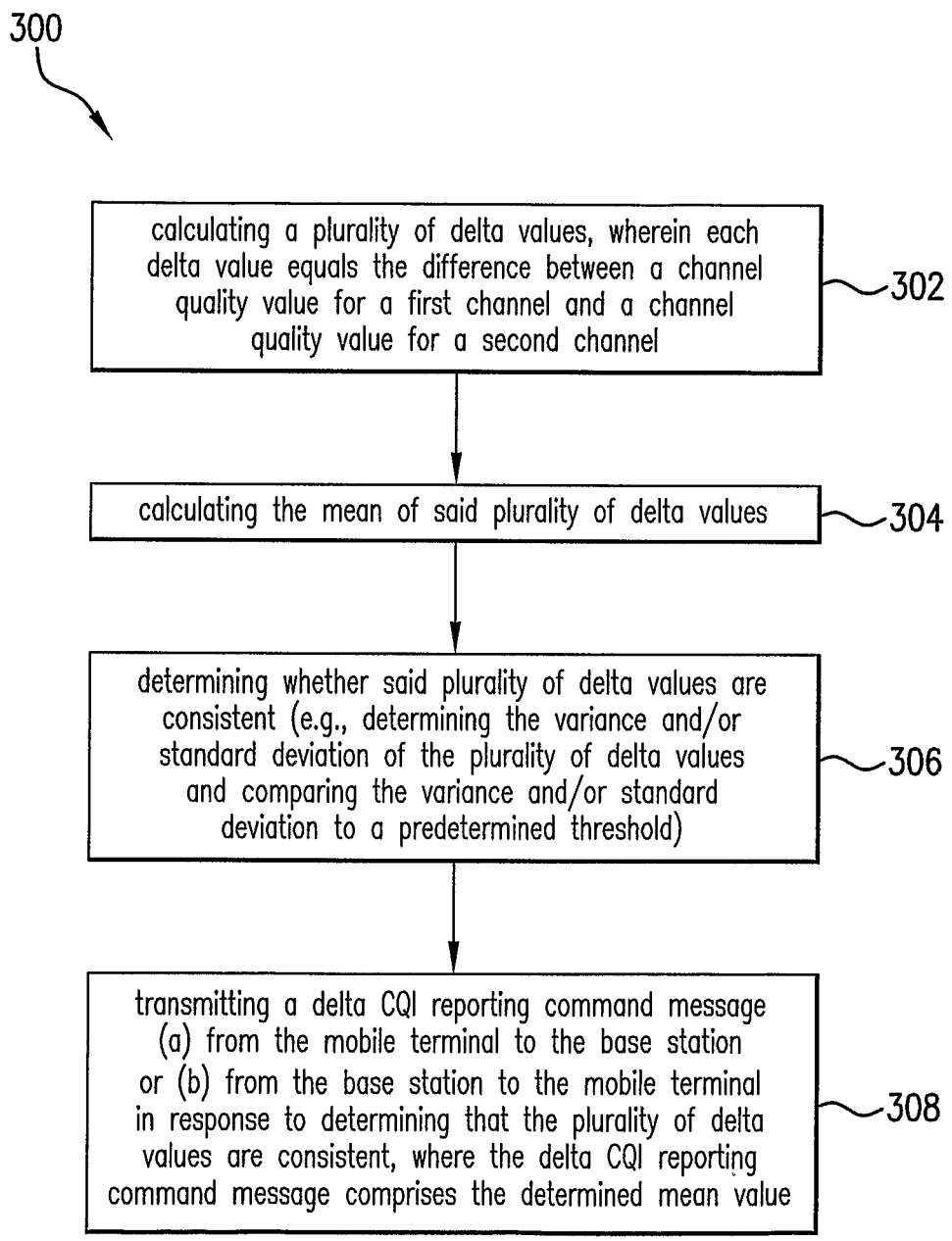
FIG. 3 is a flow chart illustrating a process according to some embodiments of the invention.

Referring now to FIG. 3, FIG. 3 is a flow chart illustrating a process for determining the offset parameter P according to some embodiments of the invention. Process 300 may begin in step 302, where a plurality of delta values (DeltaCQs) are calculated. In some embodiments, each DeltaCQ equals the difference between a channel quality value for a first channel (e.g., an SINR value for channel 111 or a channel quality indicator value that is determined from the SINR for channel 111) and a channel quality value for a second channel (e.g. channel 112).

Next (step 304), the mean of the plurality of DeltaCQs is determined. Next (step 306), it is determined whether the plurality of DeltaCQs are consistent. For example, step 306 may include determining the variance and/or standard deviation of the plurality of DeltaCQs and comparing the variance and/or standard deviation to a predetermined threshold. Next (step 308), in response to determining that the plurality of DeltaCQs are consistent, a delta CQI reporting command is transmitted (a) from UE 102 to base station 104 if UE 102 performs the above steps or (b) from base station 104 to UE 102 if base station 104 performs the above steps. The CQI reporting command includes the determined mean value, which is the value to which the offset parameter P is set. That is, the offset parameter P is set equal to the arithmetic mean of the plurality of DeltaCQs. In mathematical terms:

$$P = \left(\sum_{i=1}^{y} (DeltaCQi)\right) \bigg/ y,$$

were DeltaCQi equals (i) (CQ1,$i$−CQ2,$i$) or (ii) (CQ2,$i$−CQ1,$i$), CQ1,$i$ is a measure of channel quality for channel 111, and CQ2,$i$ is a measure of channel quality for channel 112. CQ1,$i$ may be an SNR/SINR value or a value determined from an SNR/SINR value. Likewise, CQ2,$i$ may be an SNR/SINR value or a value determined from an SNR/SINR value.

One skilled in the art should appreciate that setting P equal to the arithmetic mean of the plurality of DeltaCQ values is just one possible solution. That is, P may be set to other functions of the DeltaCQ values. For example. P may be set equal to a geometric mean, a moving average, a median, etc.

Figure 4:
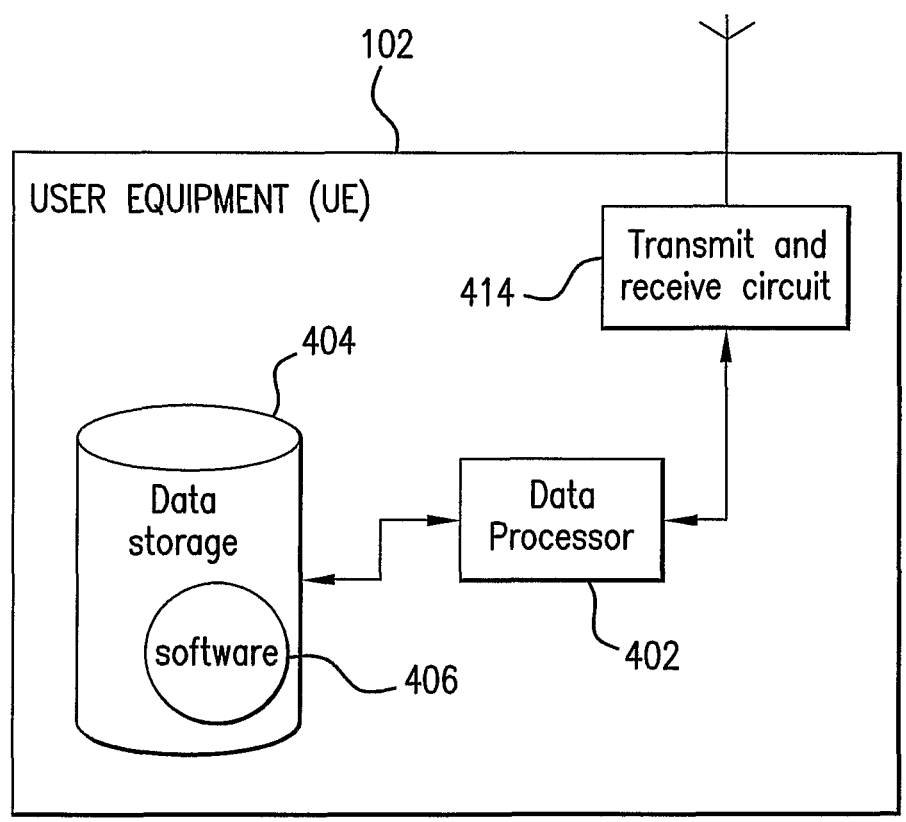
FIG. 4 is functional block diagram illustrating certain components of a UE according to some embodiments of the invention.

Referring now to FIG. 4, FIG. 4 is a functional block diagram illustrating some components of UE 102 according to some embodiments. As illustrated in FIG. 4. UE 102 includes: circuitry 414 for enabling UE 102 to communicate with base station 104; a data storage 404 (e.g., non-volatile memory, disk drive, etc) storing software 406; and a processor 402 for executing software 406. Software 406 is configured such that, when it is executed by processor 402, it causes UE 102 to perform the functions described above.

Figure 5:
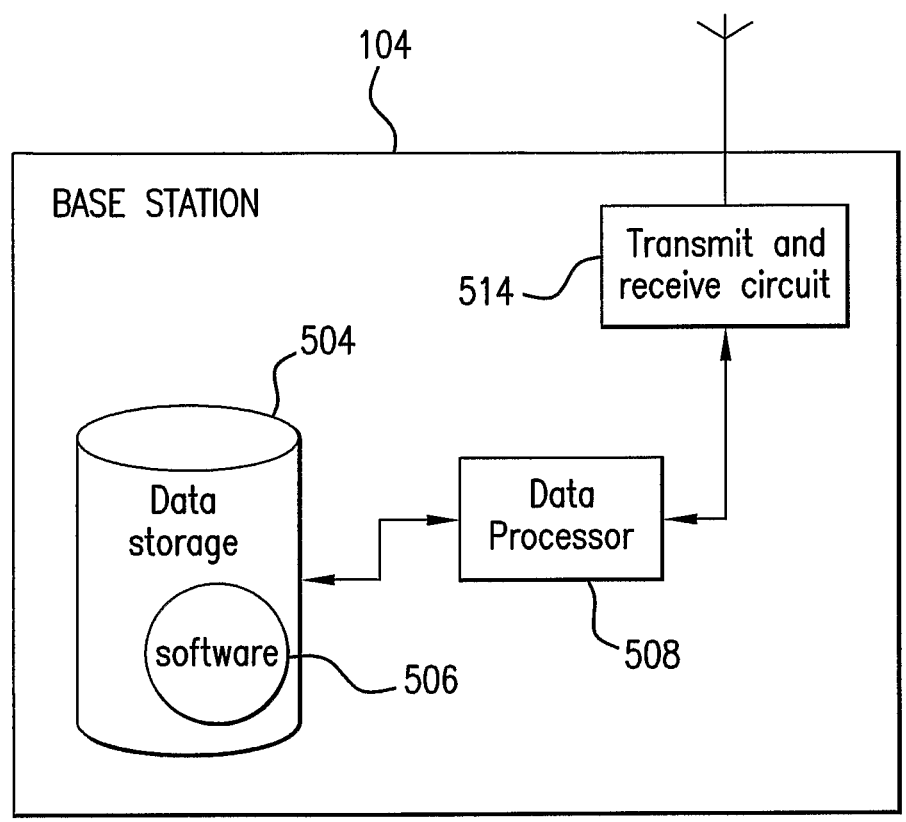
FIG. 5 is functional block diagram illustrating certain components of a base station according to some embodiments of the invention.

Referring now to FIG. 5, FIG. 5 is a functional block diagram illustrating some components of base station 104 according to some embodiments. As illustrated in FIG. 5, base station 104 includes: circuitry 514 for enabling base station 104 to communicate with UE 102: a data storage 504 (e.g. non-volatile memory, disk drive, etc) storing software 506; and a processor 508 for executing software 506. Software 506 is configured such that, when it is executed by processor 508, it causes base station 104 to perform the functions described above.

The disclosure above is described in general terms, but some terminology typically used for downlink transmission is used. However, embodiments of the invention are suitable for uplink MIMO transmission as well. Also, while many of the examples illustrate the use of two streams, embodiments of the invention are equally applicable if more than two data streams are used by the mobile terminal (e.g., a 4×4 MIMO scheme).

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for reporting channel quality information from a first communication apparatus to a second communication apparatus, comprising:
   determining a first channel quality value (CQ1), wherein CQ1 corresponds to a quality measurement for a first channel;
   reporting channel quality for the first channel by transmitting from the first communication apparatus to the second communication apparatus a first channel quality indicator value (CQI1) consisting of n bits, wherein CQI1 is a function of CQ1;
   determining a second channel quality value (CQ2), wherein CQ2 corresponds to a quality measurement for a second channel;
   after determining CQ2, calculating a value of X, wherein X equals (i) DeltaCQ+an offset parameter value (P) or (ii) DeltaCQ−P, wherein P does not equal zero, and DeltaCQ equals (i) CQ1−CQ2, (ii) CQ2−CQ1, (iii) CQI1−CQI2 or (iv) CQI2−CQI1, wherein CQI2 is a function of CQ2; and
   after calculating X, reporting channel quality for the second channel by transmitting from the first communication apparatus to the second communication apparatus an m bit value X', wherein X' is a function of X and m<n.

2. The method of claim 1, wherein CQI1 equals CQ1, CQI2 equals CQ2, and X' equals X.

3. The method of claim 1, further comprising computing P, wherein P is computed according to the following equation:

$$\frac{\sum_{i=1}^{y} DeltaCQi}{y}$$

wherein y>1, DeltaCQi equals (i) (CQ1,$i$−CQ2,$i$) or (ii) (CQ2,$i$−CQ1,$i$), CQ1,$i$ is a measure of channel quality for the first channel, and CQ2,$i$ is a measure of channel quality for the second channel.

4. The method of claim 3, wherein the first communication apparatus is a user equipment (UE) and the second communication apparatus is a base station.

5. The method of claim 4, further comprising transmitting P from the UE to the base station.

6. The method of claim 1, further comprising receiving P from the second communication apparatus.

7. The method of claim 6, wherein the first communication apparatus is a user equipment (UE) and the second communication apparatus is a base station.

8. The method of claim 1, wherein CQ1 is a measured signal-to-noise ratio (SNR) value or signal to interference plus noise ratio (SINR), and CQ2 is a measured signal-to-noise ratio (SNR) value or signal to interference plus noise ratio (SINR).

9. The method of claim 8, further comprising determining CQI1 by using CQ1 as an input to a look-up table and determining X' by using X as an input to a look-up table.

10. The method of claim 1, wherein CQ1 is stored in a look-up table and is determined by using an SNR or SINR value as an input to the look-up table.

11. A method implemented by a first communication apparatus for computing an offset parameter for use in channel quality reporting, comprising:
    calculating a plurality of delta values, wherein each delta value equals the difference between channel quality values determined for the same pair of channels at different times;
    calculating the mean of said plurality of delta values; and
    transmitting a mean value equaling the calculated mean to a second communication apparatus.

12. The method of claim 11, wherein the first communication apparatus comprises a mobile terminal and the second communication apparatus comprises a base station.

13. The method of claim 11, wherein the first communication apparatus comprises a base station and the second communication apparatus comprises a mobile terminal.

14. The method of claim 11, further comprising determining whether said plurality of delta values are consistent with one another.

15. The method of claim 14, wherein determining whether said plurality of delta values are consistent with one another comprises determining at least one of the variance and standard deviation of the plurality of delta values and comparing at least one of the determined variance and standard deviation to a respective predetermined threshold.

16. The method of claim 14, further comprising transmitting a delta channel quality indicator (CQI) reporting command to the second communication apparatus in response to determining that the plurality of delta values are consistent with one another, wherein the delta CQI reporting command directs the second communication apparatus to use differential CQI reporting and to use the mean value to calculate a plurality of channel quality indicator values that are reported to the first communication apparatus.

17. The method of claim 11, wherein the channel quality value for a first channel in said pair is an SNR value or an SINR value and the channel quality value for a second channel in said pair is an SNR value or an SINR value.

18. The method of claim 11, wherein the channel quality value a first channel in said pair is a value that is determined using a first SNR value or a first SINR value and the channel quality value for a second channel in said pair is a value that is determined using a second SNR value or a second SINR value.

19. The method of claim 18, wherein the channel quality value for the first channel is determined by using the first SNR or SINR value as an input to a look-up table and the channel quality value for the second channel is determined by using the second SNR or SINR value as an input to a look-up table.

20. The method of claim 11, wherein the first communication apparatus uses said mean value to decode a channel quality indicator (CQI) value transmitted to the first communication apparatus from the second communication apparatus.

21. The method of claim 20, wherein the first communication apparatus decodes the channel quality indicator value either by adding said mean value to the CQI value or by subtracting said mean value from said CQI value.

22. The method of claim 11, wherein the first communication apparatus uses said mean value in determining a channel quality indicator (CQI) value to report to the second communication apparatus.

23. The method of claim 22, wherein the first communication apparatus uses said mean value in determining the CQI value to report to the second communication apparatus either by adding the mean value to a delta value or by subtracting the mean value from the delta value, wherein the delta value equals the difference between a channel quality value for a first channel and a channel quality value for a second channel.

24. A mobile terminal comprising:
transmit and receive circuitry configured to enable the mobile terminal to communicate with a base station; and
a data processor configured to:
determine a first channel quality value (CQ1), wherein CQ1 corresponds to a quality measurement for a first channel;
report a quality of the first channel to the base station by transmitting to the base station, via the transmit circuitry, a first channel quality indicator value (CQI1) consisting of n bits, wherein CQI1 is a function of CQ1;
determine a second channel quality value (CQ2), wherein CQ2 corresponds to a quality measurement for a second channel;
calculate a value of X, wherein X equals (i) DeltaCQ+an offset parameter value (P) or (ii) DeltaCQ−P, wherein P does not equal zero, and DeltaCQ equals (i) CQ1−CQ2, (ii) CQ2−CQ1, (iii) CQI1−CQI2 or (iv) CQI2−CQI1, wherein CQI2 is a function of CQ2; and
report a quality of the second channel to the base station by transmitting to the base station, via the transmit circuitry, an m bit value (X'), wherein X' is a function of X and m<n.

25. The mobile terminal of claim 24, wherein CQI1 equals CQ1 and X' equals X.

26. The mobile terminal of claim 24, wherein the mobile terminal is configured to compute P according to the following equation:

$$\frac{\sum_{i=1}^{y} DeltaCQi}{y}$$

wherein y>1, DeltaCQi equals (i) (CQ1,$i$−CQ2,$i$) or (ii) (CQ2,$i$−CQ1,$i$), CQ1,$i$ is a measure of channel quality for the first channel, and CQ2,$i$ is a measure of channel quality for the second channel.

27. The mobile terminal of claim 24, wherein CQ1 is a measured SNR or SINR value, and CQ2 is a measured SNR or SINR value.

28. The mobile terminal of claim 27, wherein the mobile terminal is configured to determine CQI1 by using CQ1 as an input to a look-up table.

29. The mobile terminal of claim 24, wherein CQ1 is stored in a look-up table and the data processor is configured to determine CQ1 by using an SNR or SINR value as an input to the look-up table.

30. A base station, comprising:
transmit and receive circuitry configured to enable the base station to communicate with a mobile terminal; and
a data processor configured to:
calculate a plurality of delta values, wherein each delta value equals the difference between channel quality values determined for the same pair of channels at different times;
calculate the mean of said plurality of delta values; and
transmit to the mobile terminal, via the transmit circuitry, a mean value equaling the calculated mean.

31. The base station of claim 30, wherein the data processor is further configured to determine whether said plurality of delta values are consistent with one another.

32. The base station of claim 31, wherein the data processor is configured to determine whether said plurality of delta values are consistent with one another by determining at least one of the variance and standard deviation of the plurality of delta values and comparing at least one of the determined variance and standard deviation to a respective predetermined threshold.

33. The base station of claim 31, wherein the data processor is further configured to transmit a delta CQI reporting command to the mobile terminal in response to determining that the plurality of delta values are consistent with one another, wherein the delta CQI reporting command directs the mobile terminal to use differential CQI reporting and to use the mean value to calculate a plurality of channel quality indicator values that are reported to the base station.

34. The base station of claim 30, wherein the channel quality value for a first channel in said pair is a signal-to-noise ratio value and the channel quality value for a second channel in said pair is a signal-to-noise ratio value.

35. The base station of claim 30, wherein the data processor is further configured to use said mean value to decode a channel quality indicator (CQI) value transmitted to the base station from the mobile terminal.

36. The base station of claim 35, wherein the data processor is configured to decode the CQI value either by adding said mean value to the CQI or by subtracting said mean value from said CQI.

37. The method of claim 11, further comprising receiving a plurality of channel quality reporting messages from the second communication apparatus, each channel quality reporting message indicating a channel quality value for a first channel in said pair and a channel quality value for a second channel in said pair, and wherein said calculating comprises calculating the plurality of delta values from the plurality of channel quality reporting messages, wherein each delta value equals the difference between a channel quality value for the first channel and a channel quality value for the second channel as indicated by a respective one of the channel quality reporting messages.

38. The base station of claim 30, wherein the data processor is further configured to receive a plurality of channel quality reporting messages from the mobile terminal, each channel quality reporting message indicating a channel quality value for a first channel in said pair and a channel quality value for a second channel in said pair, and is configured to calculate the plurality of delta values from the plurality of channel quality reporting messages, wherein each delta value equals the difference between a channel quality value for the first channel and a channel quality value for the second channel as indicated by a respective one of the channel quality reporting messages.

* * * * *